(12) United States Patent
Höfig et al.

(10) Patent No.: US 10,572,331 B2
(45) Date of Patent: Feb. 25, 2020

(54) METHOD AND APPARATUS FOR A COMPUTER-BASED GENERATION OF COMPONENT FAULT TREES

(71) Applicant: Siemens Aktiengesellschaft, München (DE)

(72) Inventors: Kai Höfig, München (DE); Marc Zeller, München (DE)

(73) Assignee: Siemens Aktiengesellschaft, München (DE)

(*) Notice: Subject to any disclaimer, the term of this patent is extended or adjusted under 35 U.S.C. 154(b) by 181 days.

(21) Appl. No.: 15/629,961

(22) Filed: Jun. 22, 2017

(65) Prior Publication Data
US 2018/0018209 A1    Jan. 18, 2018

(30) Foreign Application Priority Data

Jul. 15, 2016  (EP) ................................. 16179758

(51) Int. Cl.
| | |
|---|---|
| *G06F 11/07* | (2006.01) |
| *G05B 23/02* | (2006.01) |
| *G06F 11/00* | (2006.01) |

(52) U.S. Cl.
CPC ........ *G06F 11/079* (2013.01); *G05B 23/0248* (2013.01); *G06F 11/008* (2013.01);
(Continued)

(58) Field of Classification Search
CPC .. G06F 11/079; G06F 11/008; G06F 11/0736; G06F 11/0751; G06F 11/0775; G05B 23/0248
See application file for complete search history.

(56) References Cited

U.S. PATENT DOCUMENTS

| | | | |
|---|---|---|---|
| 7,017,080 B1 * | 3/2006 | Liggesmeyer | G05B 23/0248 714/26 |
| 7,203,881 B1 * | 4/2007 | Williams | G06F 11/0709 702/185 |

(Continued)

FOREIGN PATENT DOCUMENTS

EP     2960837 A1    12/2015

OTHER PUBLICATIONS

Steiner, M. Integrating Security Concerns into Safety Analysis of Embedded Systems Using Component Fault Trees. Technischen Universität Kaiserslautern. Aug. 26, 2016.*
(Continued)

*Primary Examiner* — Paul Contino
(74) *Attorney, Agent, or Firm* — Schmeiser, Olsen & Watts LLP

(57) ABSTRACT

A computer-based method for generating a component fault tree for a technical system is provided, including loading a data model of a failure mode and effect analysis for the technical system, generating for each component of the technical system a component element for the component fault tree, wherein component output ports of the component elements are connected to input ports of the component elements, generating for each component of the data model a component fault tree element for the respective component element, wherein each component fault tree element is associated with the respective component element, generating for each failure effect of a failure mode of a component of the data model an output failure mode for the respective component fault tree elements, and generating for each failure mode of the component of the data model a basic event for the respective component fault tree elements.

14 Claims, 7 Drawing Sheets

Figure 2:
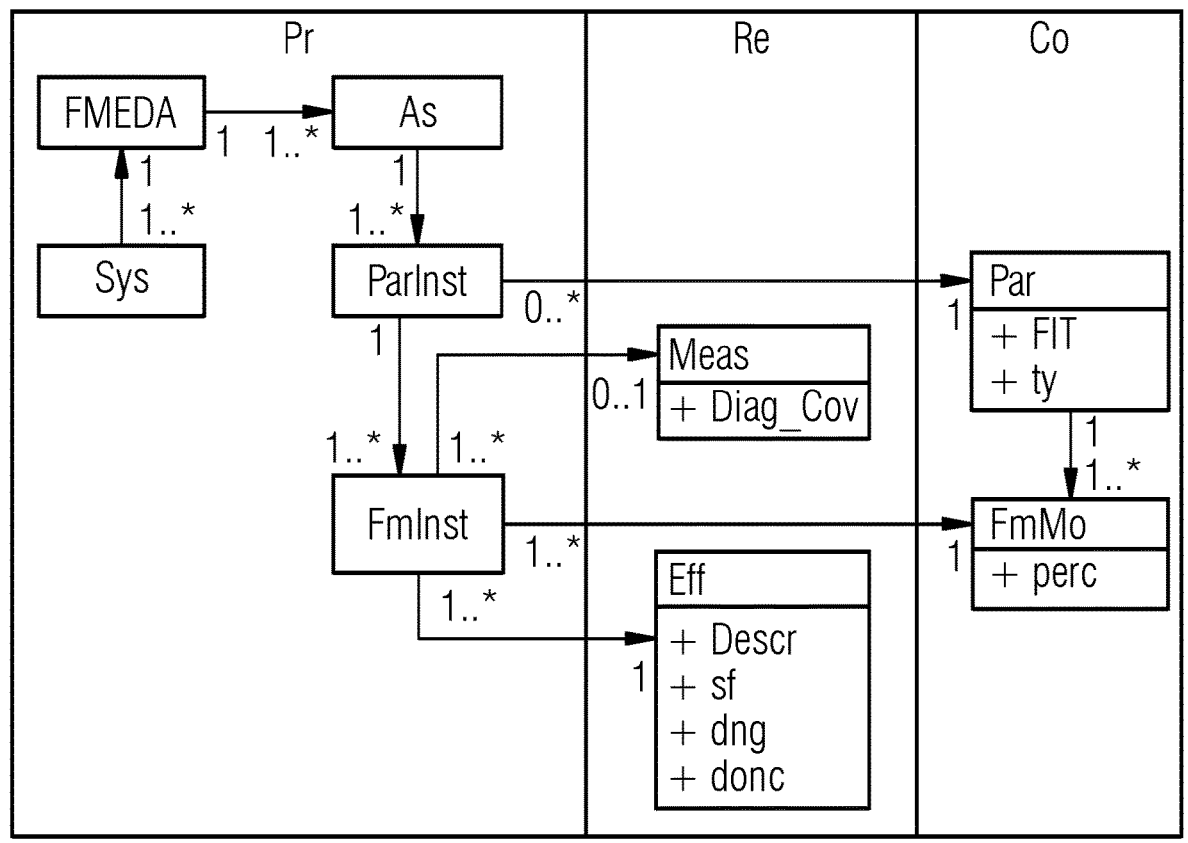

(52) U.S. Cl.
CPC ...... *G06F 11/0736* (2013.01); *G06F 11/0751* (2013.01); *G06F 11/0775* (2013.01)

(56) References Cited

U.S. PATENT DOCUMENTS

| | | | | |
|---|---|---|---|---|
| 7,681,086 | B2* | 3/2010 | Vlassova | G06F 17/5009 |
| | | | | 700/177 |
| 10,061,670 | B2* | 8/2018 | Hofig | G06F 11/0769 |
| 10,095,813 | B2* | 10/2018 | Ramesh | G06F 17/5009 |
| 2010/0223500 | A1* | 9/2010 | Heilmann | G05B 23/0248 |
| | | | | 714/26 |
| 2015/0142402 | A1* | 5/2015 | Ramesh | G06F 17/5009 |
| | | | | 703/7 |
| 2015/0269013 | A1 | 9/2015 | Höfig | |
| 2016/0170868 | A1 | 6/2016 | Hoefig et al. | |
| 2016/0266952 | A1* | 9/2016 | Hofig | G06F 11/079 |
| 2017/0185470 | A1* | 6/2017 | Hofig | G06F 11/0769 |
| 2018/0356810 | A1* | 12/2018 | Hofig | G05B 23/0248 |

OTHER PUBLICATIONS

Bernhard Kaiser, Peter Liggesmeyer, and Oliver Mäckel "A new component concept for fault trees", in SCS '03: Proceedings of the 8th Australian workshop on safety critical systems and software, pp. 37-46, Darlinghurst, Australia, 2003. Australian Computer Society, Inc.; XP055206337.

Grunske Lars et al; "An Automated Dependability Analysis Method for COTS-Based Systems"; In: "Lecture Notes in Computer Science",Jan. 1, 2005, Springer Berlin Heidelberg, Berlin, Heidelberg; ISBN: 978-3-54-045234-8; ISSN: 0302-9743; DOI:10.1007/978-3-540-30587-3_28; XP055206465;; 2005.

European Search Report for European Application No. 16179758.4, dated Dec. 22, 2016.

\* cited by examiner

FIG 1

| | FIG 1A | FIG 1B |

FIG 1A

| | C1 | C2 | C3 | C4 | C5 | C6 | C7 | C8 | C9 |
|---|---|---|---|---|---|---|---|---|---|
| Nr. | Type | Part | Circuit ID | Function | α | Failure Mode | Effect | % |
| 1 | Capacitor | 10nF/120V | C101 | smooth output | 10.00 | short circuit | amplification factor execeeds | 50% |
| | | | | | 10.00 | open circuit | limitations | 50% |
| | | | | | 10.00 | Copy this line | no effect | 0% |
| | | | | | 0.00 | Do not copy this line | | 100% |
| 2 | Resistor | 10kohm | R305 | regulates amplification factor | 20.00 | short circuit | no effect | 50% |
| | | | | | 20.00 | open circuit | amplification factor execeeds | 50% |
| | | | | | 20.00 | Copy this line | limitations | 0% |
| | | | | | 00.00 | Do not copy this line | | 100% |

FIG 1B

| C10 safe | C11 dang | C12 * | C13 $\lambda_s$ | C14 $\lambda_d$ | C15 $\lambda^*$ | C16 Diagnosis | C17 DCcomp | C18 $\lambda_{du}$ | C19 $\lambda_{dd}$ |
|---|---|---|---|---|---|---|---|---|---|
| 0 | 1 | 0 | 0,000 | 5,000 | 0,000 | Pulsed test will detect this failure | 90,0 | 0,50 | 4,50 |
| 0 | 0 | 1 | 0,000 | 0,000 | 5,000 | | 0,0 | 0,00 | 0,00 |
| 0 | 1 | 0 | 0,000 | 0,000 | 0,000 | | 0,0 | 0,00 | 0,00 |
| 0 | 0 | 1 | 0,000 | 0,000 | 10,000 | | 0,0 | 0,00 | 0,00 |
| 0 | 1 | 0 | 0,000 | 10,000 | 0,000 | Pulsed test will detect this failure | 90,0 | 1,00 | 9,00 |
| 0 | 1 | 0 | 0,000 | 0,000 | 0,000 | | 0,0 | 0,00 | 0,00 |

METHOD AND APPARATUS FOR A COMPUTER-BASED GENERATION OF COMPONENT FAULT TREES

CROSS-REFERENCE TO RELATED APPLICATIONS

This application claims priority to European application No. EP16179758.4 having a filing date of Jul. 15, 2016, the entire contents of which are hereby incorporated by reference.

FIELD OF TECHNOLOGY

The following relates to a method and apparatus for generating a component fault tree for a technical system.

BACKGROUND

The importance of safety-relevant systems in many application domains of embedded systems, such as aerospace, railway, health care, automotive and industrial automation is continuously growing. Thus, along with the growing system complexity, also the need for safety assessment as well as its effort is increasing drastically in order to guarantee the high quality demands in these application domains. Therefore, the safety assessment aims at identifying drawbacks or insufficiencies of the system architecture in terms of safety. The early identification of such drawbacks is crucial for a cost efficient development process.

The goal of the safety assessment process is to identify all failures that cause hazardous situations and to demonstrate that their probabilities are sufficiently low. In the application domains of safety-relevant systems the safety assurance process is defined by the means of safety standards (e.g., the IEC 61508 standard). Traditionally, the analysis of a system in terms of safety consists of bottom-up safety analysis approaches, such as Failure Mode and Effect Analysis (FMEA), and top-down ones, such as Fault Tree Analysis (FTA), to identify failure modes, their causes, and effects with impact on the system safety. With Component Fault Trees (CFTs) there is a model- and component-based methodology for fault tree analysis, which supports reuse by a modular and compositional safety analysis strategy. Component fault tree elements can, for example, be related to development artefacts and can be reused along with the respective development artefact.

In current practice, Failure Mode and Effects (and Diagnostic) Analysis (FME(D)A) and Fault Tree Analysis (FTA), which are both required to be performed by various standards, are built and maintained separately. Although FME(D)A as well as FTA are constructed based on the same system specification they are often created during different phases of the system development process for different purposes. In order to ensure completeness and consistency of both kinds of safety analyzed with respect to the system specification manual reviews are preformed. Such reviews are time-consuming and therefore costly.

SUMMARY

An aspect relates to providing a method and apparatus for a less error-prone faster generation of component fault trees.

A first aspect of the present invention provides a computer-based method for generating a component fault tree for a technical system comprising the steps of:

loading a data model of a failure mode and effect analysis for the technical system;

generating for each component of the technical system a component element for the component fault tree, wherein component output ports of the component elements are connected to input ports of the component elements;

generating for each component of the data model a component fault tree element for the respective component element, wherein each component fault tree element is associated with the respective component element;

generating for each failure effect of a failure mode of a component of the data model a output failure mode for the respective component fault tree elements;

generating for each failure mode of the component of the data model a basic event for the respective component fault tree elements.

Unless specifically stated otherwise, as apparent from the following discussions, it is appreciated that throughout the specification discussions utilizing terms such as "processing", "computing", "computer-based", "calculating", "determining", "generating", "configuring" or the like, refer to the action and/or processes of a computer that manipulates and/or transforms data into other data, said data represented as physical, e.g. such as electronic, quantities. The term "computer" should be expansively construed to cover any kind of electronic device with data processing capabilities, including, by way of nonlimiting example, personal computers, servers, handheld computer systems, Pocket PC devices, Cellular communication device and other communication devices with computing capabilities, processors and other electronic computing devices.

As used herein, the term "processor" refers, for example, to controllers, microcontrollers (e.g. digital signal processor (DSP) possibly in combination with memory and storage units memory unit storing computer-readable instructions, application specific integrated circuit "ASIC", etc.), processor cores, central processing units, integrated circuits/processing circuitry (e.g. application specific integrated circuit "ASIC", field programmable gate arrays "FPGA" etc.) or digital signal processors. Furthermore, the term "processor" can, for example, refer to virtual processors, virtual CPUs, soft processors or soft CPUs. Moreover, said processor can, for example, be configured to execute computer readable instructions such that said processor is preferably configured to perform functions which implement embodiments of the invention.

As used herein, the term "module" refers, for example, to a processor and/or a memory unit storing computer-readable instructions. For example, the processor is specifically configured to execute the computer readable instructions such that said processor is preferably configured to perform functions which implement embodiments of the invention, such as a step of the inventive method.

As used herein, the term "node" preferably of a component fault tree, a subtree of a component fault tree or the like, refers, for example, to elements contained in these data structures. This elements can, for example, be (logic) gates (e.g., AND-Gates or OR-Gates), ports (e.g., component output ports, component input ports), failure modes (e.g., input failure modes, output failure modes), events (e.g., basic events, top level events), component fault tree elements or a combination. Preferably, not all possible nodes/node types are available in all trees types. Preferably, component input ports or just input ports can also be called inports. Preferably, component output ports or just output ports can also be called outports. Preferably, each node is a dataset or a data structure containing information about the elements of a hazard information tree, component fault tree, a subtree of a component fault tree or the like.

As used herein, the term "component", "component element", "component fault tree element", "nodes" or the like, refer, for example, to data structures or data streams of a failure mode and effects analysis, a component fault tree or a fault tree analysis containing information about components and/or information/characteristics of components of a technical system. A component fault tree element can, for example, group nodes of a component fault tree related to the component of the technical system.

As used herein, the term "subtree", "tree", "component fault tree", "model", "data model", "meta model" or the like, refer, for example, to data structures storing information about the technical system and/or components of the technical system. These data structures can, for example, contain references to instances of nodes, components, component elements, component fault tree element or the like, for example, of a data model (preferably of a failure mode and effects analysis or a component fault tree/fault tree analysis) representing the technical system, for example, to conduct a safety analysis of the technical system. The instances can, for example, be generated by instantiating classes, data structures or the like for the respective data structures, for example, by means of executable instructions and/or a processor.

As used herein, the term "technical system" refers, for example, to a complex technical system (e.g., a power plant or a manufacturing factory) with a plurality of technical components preferably interacting with each other. A technical system can, for example, be a field device, a generator or a power plant (e.g., a wind turbine, a nuclear power plant or a water power plant). Preferably, the technical system comprises a plurality of hardware components and/or software components. Furthermore, the technical system can, for example, comprise at least one component having a communication interface configured to connect the inventive apparatus and/or a test environment. Preferably a technical system can be a subsystem and/or a set of selected components of a technical system.

As used herein, the term "component fault tree" or "CFT" refers, for example, to a complete or incomplete component fault tree, preferably based on a computer-based (data) model.

As used herein, the term "failure mode and effects (and diagnostic) analysis", "failure mode and effects (and diagnostic) analysis", "FME(D)A", "FMEA" refers, for example, to a failure mode and effects (and diagnostic) analysis preferably based on a computer-based (data) model.

Preferably, the step of generating for each component of the technical system a component element for the component fault tree, wherein component output ports of the component elements are connected to input ports of the component elements is, for example, conducted according to a system specification of the technical system.

Preferably, the inventive method simplifies significantly the calculation or generation of component fault trees. Preferably, the inventive method automatically synthesize information to build component fault trees (CFTs) from a pre-existing model-based failure mode and effects (and diagnostic) analysis (FME(D)A) and enables, for example, the generation of a model for a fault tree analysis (FTA), which is preferably consistent with the inductive safety analysis of the safety-critical system. Thereby, for example, the manual effort to build and review a safety analyses is reduced, since, for example, consistency and completeness between the inductive and the deductive safety analysis is automatically achieved. Preferably, by means of the inventive method a fault tree analysis can, for example, be conducted in a semi-automatic manner, because the component fault tree is, for example, not fully automated synthesized from the FME(D)A. More particularly, a component fault tree, fault tree analysis or a failure mode and effects analysis is, for example, impossible to maintain or conduct manually for (complex) technical systems. The inventive method allows, for example, conducting a fault tree analysis (or generating a component fault tree) for (complex) technical systems which have, for example, hundreds or thousands components.

Preferably, a safety expert uses the generated component fault tree data and, for example, completes the component fault tree. Preferably, the safety expert uses a specification of the technical system to complete the component fault tree. Preferably, the inventive method simplifies the generation of a component fault tree in a semi-automatic manner.

In another embodiment of the method input failure modes and logical gates are added to the component fault tree, and the input failure modes and the logical gates are associated with the basic events, output failure modes, input ports and output ports.

Preferably, adding these nodes and associations to the component fault tree, allows, for example, a safety expert to complete the component fault tree in a computer-based/computer-assisted manner. For example, on a display the nodes, components and elements of the component, which were automatically generated based on the data model and the inventive method, are depicted. Preferably, a safety expert uses this information and the system specification to complete the component fault tree in a preferably significantly shorter time compared to conventional methods. Preferably, depicting the incomplete component fault tree and completing the component fault tree is conducted in a computer-based manner, for example, by using a software application which is capable to depict the incomplete component fault tree and preferably provides tools for completing the component fault tree.

In another embodiment of the method
each output failure mode is associated with an output port, for each output failure mode an input failure mode is created;
each input failure mode is associated with the respective input port, which is associated with the respective output port, which associated the respective output failure mode;
each basic event is associated with the respective output failure mode.

Preferably, adding these nodes and associations to the component fault tree is automatically conducted in a computer-based manner to complete, for example, an incomplete component fault tree. This automatically generated component fault tree can, for example, be used by a test environment or a test controller to test the technical system or a test system.

In another embodiment of the method the respective output failure mode is generated for failure effects which are a result of more than one failure mode.

Preferably, by generating the component fault tree in this manner, the generation process can be simplified and the (incomplete) component fault tree is generated in significantly shorter time.

In another embodiment of the method the component fault tree is used to conduct a component fault tree analysis of the technical system.

In another embodiment of the method, by means of the component fault tree a test environment with a test technical system is controlled.

Preferably, by using the complete/incomplete component fault tree by a test environment the development process can, for example, be improved. For example, the test technical system can comprise interfaces to inject or stimulate basic events according to the failure mode and effects analysis or the component fault tree. Preferably, the resulting behaviour is compared, preferably automatically, with the failure mode and effects analysis or the component fault tree (or the data contained in the data models of the CFT or FME(D)A) to, for example, verify the behaviour of the test technical system. The test technical system can, for example, be the technical system, a virtual technical system, which simulates partially or completely the technical system, or a prototype of the technical system.

In another embodiment of the method the basic events and the output failure modes are verified by a test environment with a test technical system.

Preferably, by using the complete/incomplete component fault tree by a test environment the development process can, for example, be improved. For example, the test technical system can comprise interfaces to inject or stimulate basic events according to the failure mode and effects analysis or the component fault tree. Preferably, the resulting behaviour is compared, preferably automatically, with the failure mode and effects analysis or the component fault tree (or the data contained in the data models of the CFT or FME(D)A) to, for example, verify the behaviour of the test technical system. The test technical system can, for example, be the technical system, a virtual technical system, which simulates partially or completely the technical system, or a prototype of the technical system.

In another embodiment of the method the component fault tree is updated, if the data model is updated.

Preferably, the inventive method enables a continuous synchronization of FME(D)A and CFT models, for example, along the design life-cycle in order to guarantee the consistency of the technical systems' safety analyses. Preferably, in iterative or incrementally (agile) development processes, in which the system specification is modified during the design frequently, the inventive method reduces, for example, significantly time-consuming manual reviews and ensures, for example, consistency of both kinds of safety analyzed with respect to the system specification of the technical system. Thus, the quality of safety analyses can, for example, be increased by providing automated consistency checks, since it is, for example, possible to detect deviation and automatically fill up gaps between FME(D)A and CFT.

In another embodiment of the method, for the component fault tree inconsistency information is acquired, if the data model is updated.

Preferably, the inconsistency information can, for example, trigger an alarm to indicate that the component fault tree and the failure mode and effects analysis are out of sync, which can, for example, cause to an unexpected and unhandled failure state of the technical system or a test technical system.

A further aspect of the present invention provide an apparatus for generating a component fault tree for a technical system comprising:

a first loading module for loading a data model of a failure mode and effect analysis for the technical system;

a first generating module for generating for each component of the technical system a component element for the component fault tree, wherein component output ports of the component elements are connected to input ports of the component elements;

generating for each component of the data model a component fault tree element for the respective component element, wherein each component fault tree element is associated with the respective component element;

generating for each failure effect of a failure mode of a component of the data model a output failure mode for the respective component fault tree elements;

generating for each failure mode of the component of the data model a basic event for the respective component fault tree elements.

In another embodiment of the apparatus, the apparatus comprises one or more further modules configured to perform the inventive method or one or more of the embodiments of the inventive methods.

A further aspect of the present invention provides a computer program product storing executable instructions adapted to perform the method disclosed by the present disclosure.

According to a preferred variant of the computer program product, the program product stores executable instructions adapted to configure a manufacturing device, for example, a 3D-printer or another device to create the inventive device/apparatus.

Furthermore, a providing apparatus is claimed for saving and/or providing a program data and/or instruction block of said executable instructions (method and/or device). The providing apparatus can be a data storage saving and/or providing the computer program product. Alternatively, the providing apparatus can be a computer system and/or a server system and/or a network and/or a cloudbased computer system and/or virtual computer system. The providing apparatus saves and/or provides the computer program product. Preferably, the complete computer program product is provided by said providing apparatus in the form of a download, for example, as a file or a data stream. Alternatively, the computer program product is provided by at least two partial downloads, for example, provided by a peer to peer network, each containing a piece of said computer program product. For example such a computer program product can be provided by a data storage, which is read and executed by a computer system. As a consequence the computer system is able to execute the disclosed method. Alternatively and/or additionally, the computer program configures a manufacturing device as above mentioned.

A data storage or computer-readable medium can be electronic, magnetic, optical, or a semiconductor system (or apparatus or device). Examples of a computer-readable medium include, but are not limited to, a semiconductor or solid state memory, magnetic tape, a removable computer diskette, a random access memory (RAM), a read-only memory (ROM), a rigid magnetic disk, an optical disk, etc. Current examples of optical disks include compact disk-read only memory (CD-ROM), compact disk-read/write (CD-R/W) and digital versatile disk (DVD).

Further modifications and variations will emerge from the features of the dependent claims.

BRIEF DESCRIPTION

Figure 3:
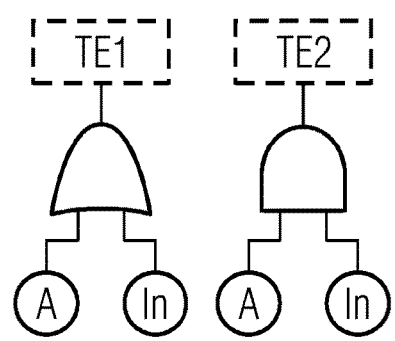
Figure 4:
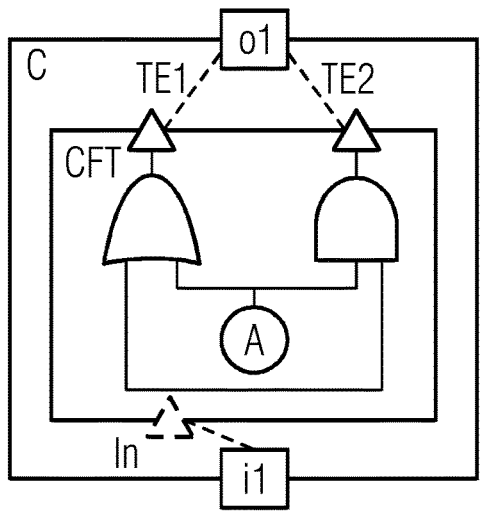
Figure 4:
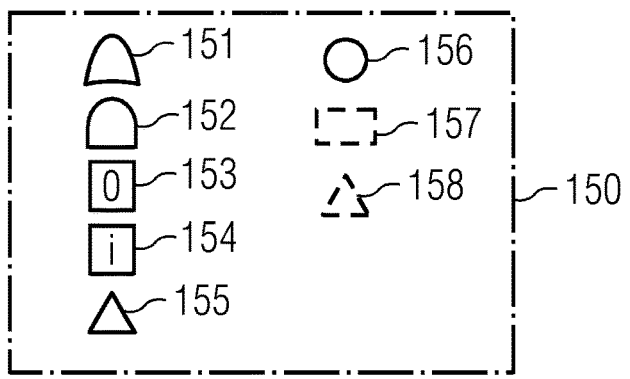
Figure 5A:
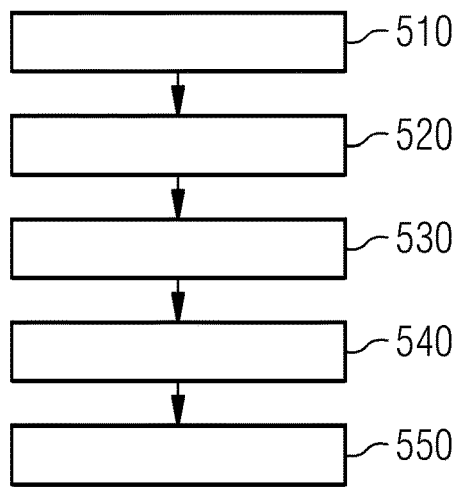
Figure 5B:
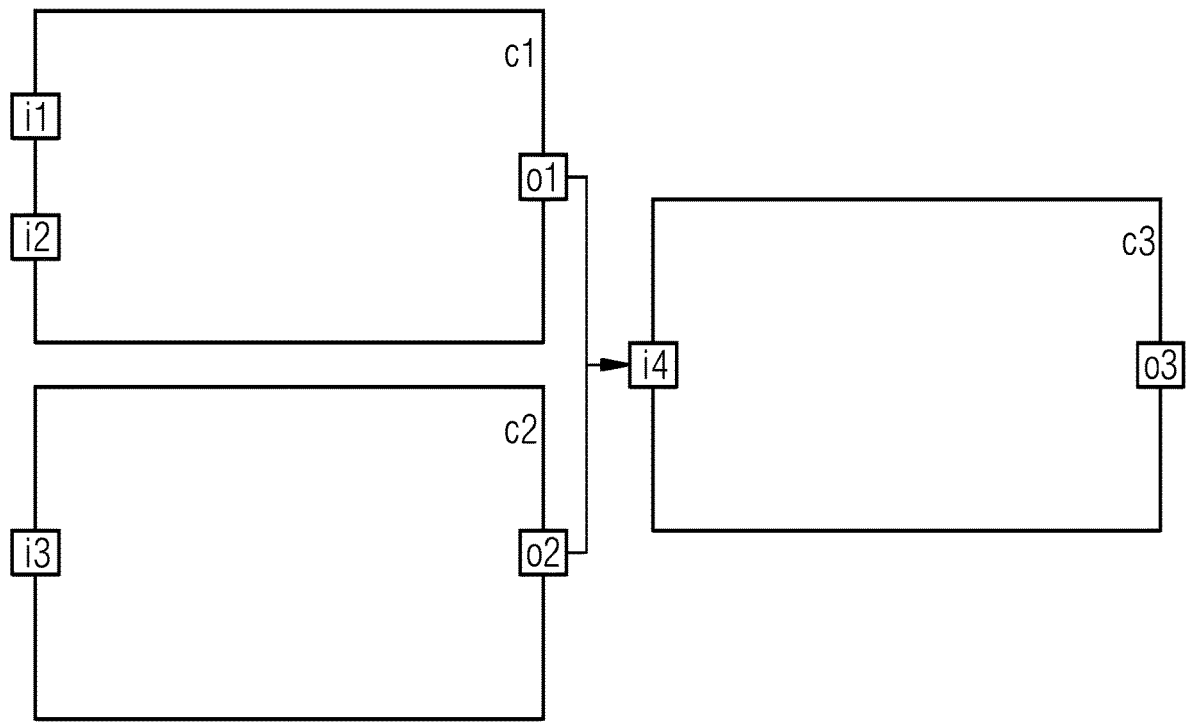
Figure 5C:
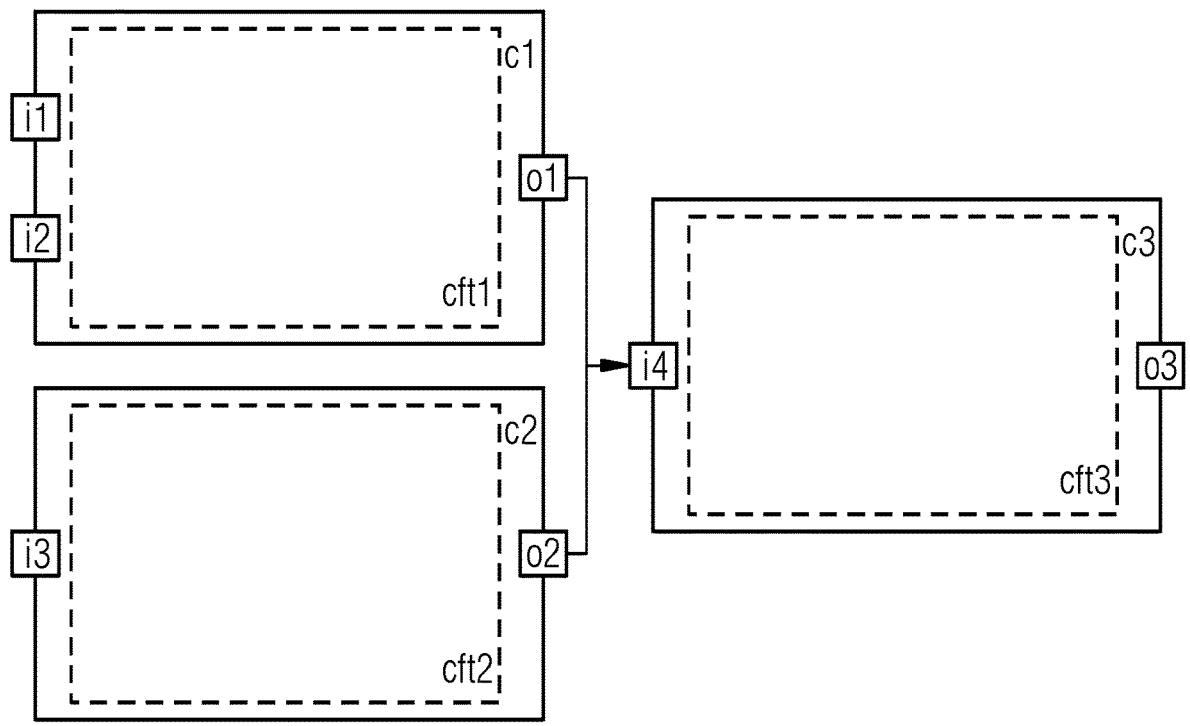
Figure 5D:
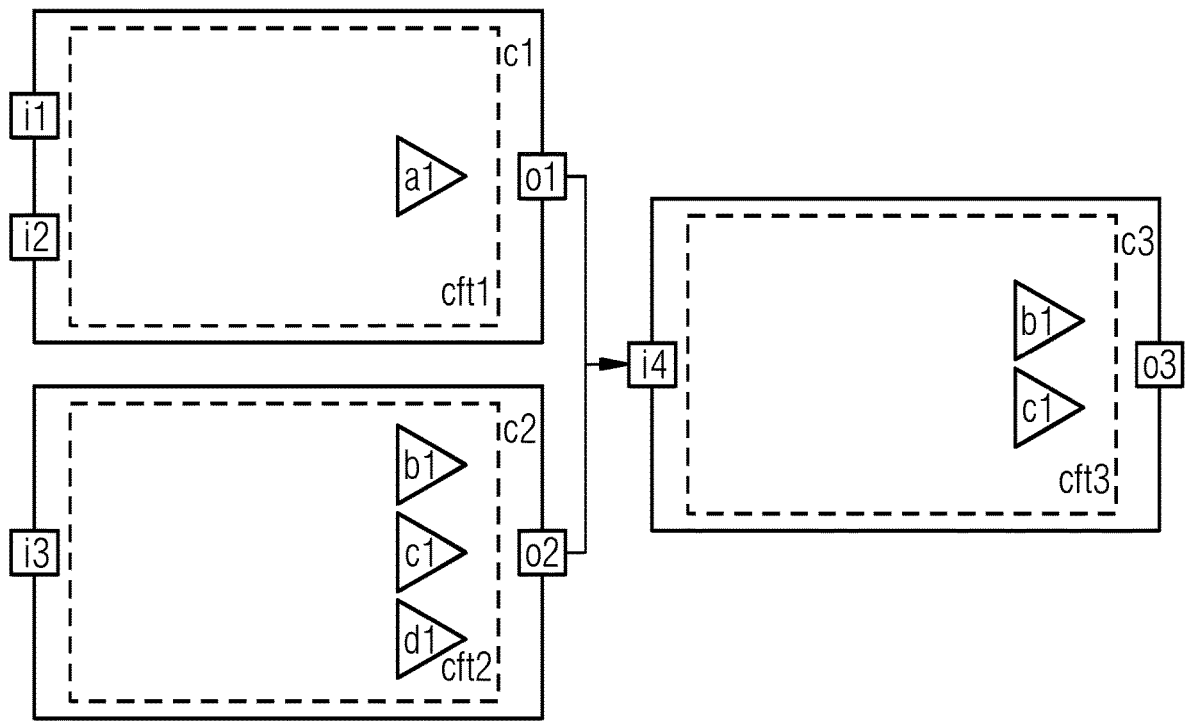
Figure 5E:
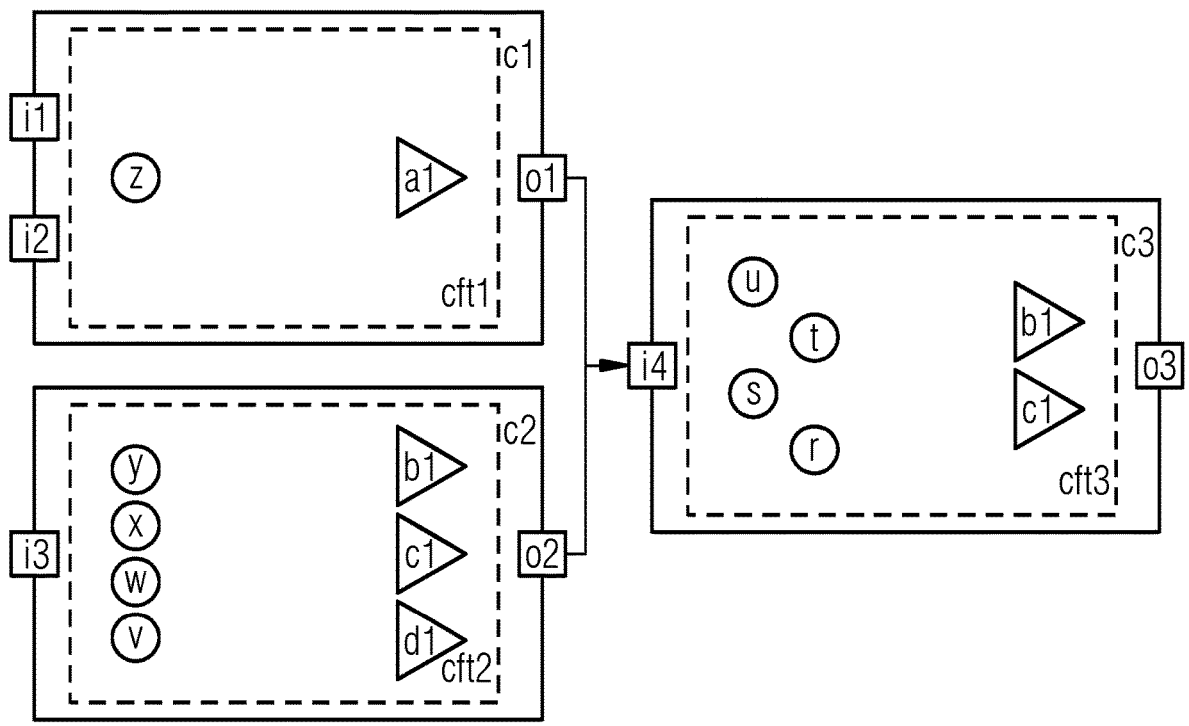
Figure 5F:
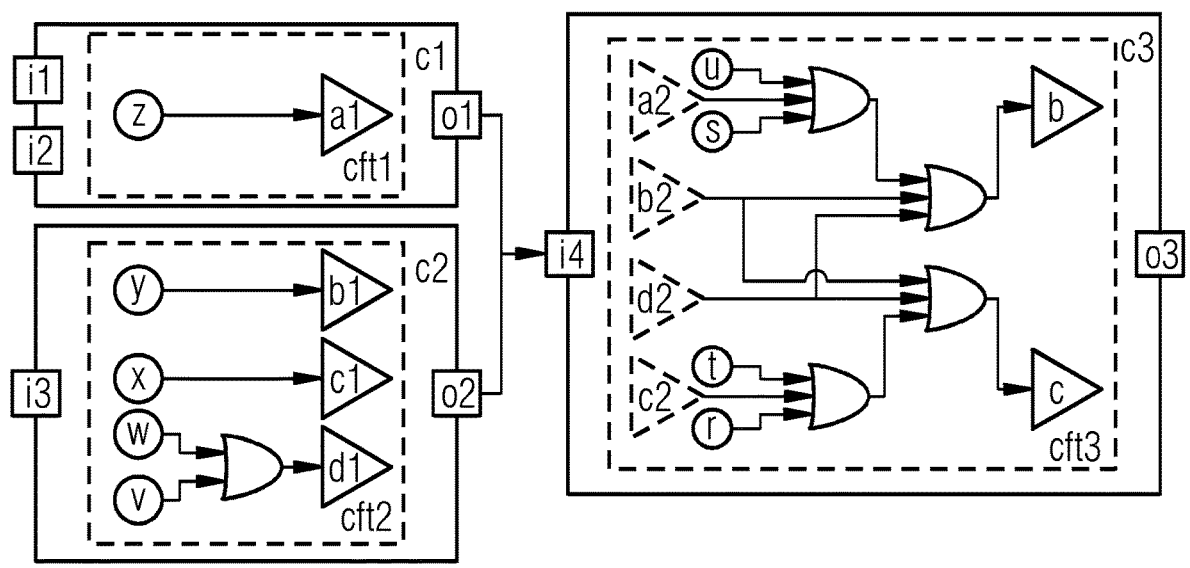
Figure 6:
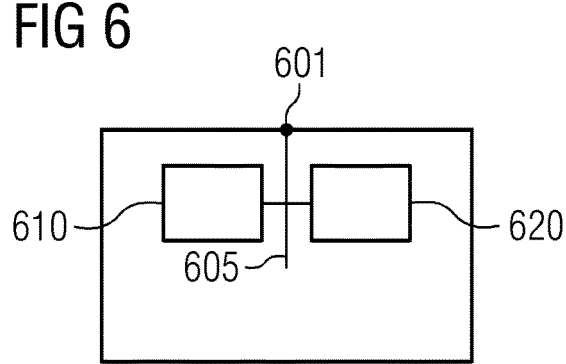

Some of the embodiments will be described in detail, with reference to the following figures, wherein like designations denote like members, wherein:

FIG. 1a shows a first failure mode and effects analysis;
FIG. 1b shows a second failure mode and effects analysis;
FIG. 2 shows a simple model based failure mode and effects analysis;
FIG. 3 shows a classic fault tree;
FIG. 4 shows a component fault tree;
FIG. 5a shows a flow chart of an embodiment of the method;
FIG. 5b shows a first diagram generated component fault tree generated by a possible exemplary embodiment of the method;
FIG. 5c shows a second diagram generated component fault tree generated by a possible exemplary embodiment of the method;
FIG. 5d shows a third diagram generated component fault tree generated by a possible exemplary embodiment of the method;
FIG. 5e shows a fourth diagram generated component fault tree generated by a possible exemplary embodiment of the method;
FIG. 5f shows a fifth diagram generated component fault tree generated by a possible exemplary embodiment of the method; and
FIG. 6 shows a schematic view of an apparatus for generating a component fault tree, in accordance with embodiments of the present invention.

The accompanying drawings are intended to provide a better understanding of the embodiments. They show schematics of embodiments and serve in conjunction with the description to explain principles and concepts of the disclosed subject matter. Other embodiments and many of the cited advantages will emerge in respect of the drawings. The elements of the drawings are not necessarily shown in scale with one another. Identical reference characters here designate identical components or components of comparable effect.

DETAILED DESCRIPTION

Preferably, the presented embodiments are implemented by a processor and/or a memory device unless otherwise noted.

In detail, to implement and/or execute embodiments of the invention, the inventive method, components, devices etc. comprise at least one processor and/or at least one memory unit (e.g. a hard disk drive, cache memory, secure digital memory card, random-access memory) unless otherwise noted. Additionally, the inventive method, components, devices etc. comprise, for example, other features known by a skilled person. For example, these features can be an input device, like a computer mouse, or a display device, like a TFT-display.

FIG. 1 shows a simple manually maintained FMEA table 100 for a compact embedded system.

A failure mode and effects analysis (FMEA) is an inductive reasoning (e.g., forward logic) single point of failure analysis for safety critical systems. Failure mode and effects analysis are available in different variations for different applications, such as software or processes. Failure mode and effects analysis may be either qualitative or quantitative. The variations analyze failure modes of elements and the effects of the failure modes on the analyzed system. A generic quantified FMEA is described for a domain independent application of electrical/electronic/programmable electronic systems in the International Standard IEC 61508. Without the quantifications, the FMEA described therein is also generic for the qualitative variation of the analysis. The variation of FMEA described therein is referred to as a Failure Mode Effects and Diagnostic Analysis, or Failure Mode Effects and Diagnostic Coverage Analysis (FMEDA).

A FMEA (or FMEDA) as described in the above-referenced publication is typically developed using a manually maintained table with the support of a spreadsheet processing computer system. FIGS. 1A and 1B collectively show an example of a table from such a system. In column C1 of the table, the analyzed parts are numerated. Parts may be components or electronic devices. In column C2, the type of the analyzed part is indicated, e.g., a capacitor or resistor. In column C3, the electronic type of the part is indicated, e.g., the capacitor is a 10 nF/120V capacitor. In column C4, the identifier is used to identify the part in the specific system is indicated, such as an identification number of the electric circuit plan, e.g., CIOI for the capacitor.

In column C5, the function of the part is textually described. In column C6, the failure rate lambda is indicated, e.g., 10FIT (failure in time, $1*10^{-9}$ per hour) for the capacitor. Column C7 presents the failure modes of the part, such as two metal connectors of the capacitor may either short circuit or be damaged and in an open circuit state. Column C8 is used to describe a failure effect that corresponds with a failure mode. For example, if the capacitor is in an open circuit state, the failure has no consequences. Column C9 is used to allocate (e.g., split) the failure rate lambda (as indicated in column C6) to the individual failure modes. For example, the failure rate of 10FIT of the capacitor is equally split for the two failure modes of the capacitor. Columns C10 to C12 are used to categorize the failure effect into the categories "safe", "dangerous", and "disregard" (or "don't care"). Columns C13 to C15 calculate the residual failure rate for the specific failure effect and category (safe $\square_s$, dangerous $\square_d$, and disregard $\square^*$). For example, the failure rate $\square_d$ for the failure mode "short circuit" is 5FIT since $$10FIT(\text{column } C6)*50\% \text{ (column } C9)*1(\text{column } C11)=5FIT$$

The other columns are calculated accordingly. Column C16 is used to describe a possible diagnostic measure capable of detecting or mitigating a dangerous failure effect. For example, the failure effect corresponding to the failure mode "short circuit" of the capacitor is detected by a pulsed test signal. Column C17 indicates the effectiveness of that measure. For example, the pulsed signals that detect the dangerous failure effect of the open circuit failure mode of the capacitor may only detect or mitigate a fraction of 90% of the occurrences of that failure effect. Column C18 is used to calculate the residual failure rate that a dangerous failure effect goes undetected ($\square_d$ undetected, or $\square_{du}$). Column C19 is used to calculate the failure rate for the case that the dangerous failure effect is detected by the diagnostic measure ($\square_d$ detected, or $\square_{dd}$).

The manually maintained table of FIG. 1 may contain automation, such as when implemented in a spreadsheet application. The automation may calculate the values for the different failure rates or completeness of the percentages.

Because modern safety critical systems tend to increase complexity, automations and tool support have a long history in research and industry. Whereas compact embedded systems may be analyzed using FMEA in a manually maintained table, more complex systems may result in an unmanageably long table, such as when larger development teams are involved.

The FIG. 2 shows a simple model based failure mode and effects analysis.

In detail, a meta model for meta model-based failure mode and effects analysis is depicted, which is capable to solve the aforementioned problems (FIG. 1) by providing a formal definition of failure mode and effects analysis information and enabling reuse in this context.

The meta model has tree types of classes/instances:
Product classes/instances Pr, which are related to a specific product.

Reusable classes/instances Re, which were calculated/generated for previous failure mode and effects analysis, for example, other technical system. Reusable classes can, for example, be a result of measurements for specific components of a technical system, for example, in a specific work environment.

Collaborative classes/instances Co, which are basically a catalog of classes usable by any failure mode and effects analysis. Collaborative classes Co comprise, for example, the information about a component according to its specification.

To conduct a failure mode and effects analysis, for example, for a technical system (e.g. a nuclear power plant), a system instance Sys of a system class is instantiated. Furthermore a failure mode and effects analysis instance FMEDA of a failure mode and effects analysis class is instantiated and referenced in the system instance Sys.

Furthermore an assembly instance As of an assembly class is instantiated and referenced in the failure mode and effects analysis FMEDA. For example, the assembly instance contains information about parts of the technical system. Therefore, assembly instance holds at least one reference to a part instance PartInst of a part class representing part information of a component of the technical system. Each part instance PartInst comprises references to instances of other classes:
A part specification instance Par of a part specification class and a failure mode instance of a failure mode class.
The failure mode instance comprises further references to other instances:

A measure instance Meas of a measure class, which comprises, for example, diagnostic coverage data field Diag_Cov. Preferably, the diagnostic coverage data field holds information about the effectiveness of the measure to prevent the occurrence of a specific failure mode.

An effect instance of an effect class is instantiated, which comprises data fields for describing Descr the effect, and an indication how dangerous (e.g. safe sf indicating the effect of the failure can safely handled, dangerous dng indicating the effect is potentially dangerous, don't care donc indicating the effect is irrelevant for the safety of the system) the effect of the failure mode is.

A failure mode specification instance FmMo of a failure mode specification class is instantiated, comprising the probability for occurring the failure mode described by the failure mode information class. Furthermore, the part specification instance Par holds a reference to its respective failure mode specification instances.

Preferably, the system instance, the failure mode and effects analysis instance FMEDA, the assembly instance As the part instance ParInst and the failure mode instance FmInst are product instances Pr.

Preferably, the measure instance Meas and the effect instance Eff are reusable instances Re.

Preferably, the part specification Par and the failure mode specification FmMo are collaboration instances Co.

Preferably, the necessary instances are instantiated and afterwards for the (technical) system a failure mode and effect analysis is conducted.

FIG. 3 shows a conventional classic fault tree and FIG. 4 shows a corresponding component fault tree CFT. Furthermore, FIG. 4 shows a legend 150 which shall preferably be used for all other figures. In detail, the legend 150 depicts (logic) gates (e.g., OR-Gates 151, AND-Gates 152), ports (e.g., component output ports 153, component input ports 154), failure modes (e.g., input failure modes 158, output failure modes 155), events (e.g., basic events 156, top level events 157), component fault tree elements or a combination. It shall, for example, be understood, that not all possible nodes/node types are available in all possible trees.

Usually, a component fault tree is a Boolean model associated to system development elements such as components (e.g. Software components, subsystem, devices, etc. of a technical system). It has, for example, the same expressive power as classic fault trees that can for example be found in [1]. Classic fault trees as well as component fault trees are used to model failure behaviour of safety relevant systems (e.g. technical systems).

This failure behaviour is, for example, used to document that a system is safe and can also be used to identify drawbacks of the design of a system.

In a component fault tree CFT, a separate component fault tree element is related to a component. Failures that are visible at the component output port of a component fault tree element are models using output failure modes which are related to the specific component output port. To model how specific failures propagate from a component input port of a component fault tree element to the component output port, input failure modes are used. The internal failure behaviour that also influences the output failure modes is modelled using the Boolean/logic gates such as OR 151 and AND 152 as well as basic events 156.

In both trees of FIG. 3 and FIG. 4, the top events or output failure modes TE1 and TE2 can be modelled. Additionally, to the Boolean formulae (logic gates) that are also modelled within the classic fault tree illustrated in FIG. 3, the component fault tree model illustrated in FIG. 4 allows to associate the specific top events TE to the corresponding component output ports where these failures can appear. Top event TE1, for example, appears at component output port o1.

In FIG. 4, an Input Failure Mode In is associated with component input port i1 of the component C. The inner failure behaviour is modelled by basic event A as input to an OR gate and an AND gate. Using this methodology of components also within fault tree models, benefits during the development of the complex system can be observed, for example, an increased maintainability of the safety analysis model.

FIG. 5 shows flow chart of a possible exemplary embodiment of an inventive method.

In detail, FIG. 5 shows a computer-based method for a semi-automatic generation of a component fault tree for a technical system.

The inventive method comprises a first step 510 for load a (meta) data model of a failure mode and effect analysis for the technical system.

For example, the (meta) data model can comprise following information:

| Part | Failure mode | Effect | lamda |
|------|--------------|--------|-------|
| c1 ps | (z) voltage output too high | (a) signal too high | 700.00 |
| c2 ic1 | (y) open | (b) commission of signal | 2.80 |
| c2 ic1 | (x) closed | (c) omission of signal | 0.80 |
| c2 ic1 | (w) drift 0.5 | (d) signal too late | 0.20 |
| c2 ic1 | (v) drift 2 | (d) signal too late | 0.20 |
| c3 t1 | (u) open circuit | (b) commission of signal | 2.50 |
| c3 t1 | (t) short circuit | (c) omission of signal | 2.50 |
| c3 c1 | (s) open | (b) commission of signal | 0.40 |
| c3 c1 | (r) closed | (c) omission of signal | 1.60 |

The inventive method comprises a second step 520 for generating for each component of the technical system a component element for the component fault tree, wherein component output ports of the component elements are connected to input ports of the component elements. Preferably, this is done according to a system specification of the technical system.

For example, let the technical system S consist of a set of components $C=\{c1, \ldots cn\}$. Each component $c \in C$ includes a set of input ports $IN(c)=\{in_1, \ldots, in_p\}$ and a set of output ports $OUT(c)=\{out_1, \ldots, out_q\}$. The information flow between the output ports of a component $ci \in C$ and the input ports of another component $cj \in C$ (with $ci \neq cj$) is represented be a set of connections.

$CON=\{(out_x, in_y) | out_x \in OUT(ci), in_y \in IN(cj)\}$

The example technical system and the initial component fault tree is depicted in FIG. 5b and defined by:
- $C=\{c1, c2, c3\}$
- $IN(c1)=\{i1, i2\}$
- $IN(c2)=\{i3\}$
- $IN(c3)=\{i4\}$
- $OUT(c1)=\{o1\}$
- $OUT(c2)=\{o2\}$
- $OUT(c3)=\{o3\}$
- $CON=\{(o1, i4), (o2, i4)\}$ If $ci \in C$ has a component fault tree element $cfti \in CFT$, then it is $\dot{CFT}(ci)=cfti$ with $cfti \neq \emptyset$.

Each component fault tree element $cfti \in CFT(ci)$ of a component $ci \in C$ may have a set of input failure modes $IFM(cfti)=\{ifm_1, \ldots, ifm_s\}$ as well as a set of output failure modes $OFM(cfti)=\{ofm_1, \ldots, ofm_t\}$. Moreover, a component fault tree element $cfti \in CFT$ may have a set of basic event $B(cfti)=\{b1, \ldots, br\}$.

For each of the components the respective component elements are generated in the instantiated component fault tree and the input ports and output ports are connected/associated as described above.

For example, a (meta) model based FME(D)A of the technical system S is specified as follows:

$FMEDA_S=(C,PI,FM,E)$ where $PI=\{pi_1, \ldots, pi_n\}$ is the set of part instances. A part instance represents an instance of a specific part of the technical system (e.g. an electronic device)—a so-called assembly or component $c \in C$:

$$PI_c \subseteq PI \text{ with } PI_c = \bigcup_{c \in C} PI \text{ and } \cup \bigcup_{c \in C} PI_c = \emptyset$$

Each part instance is related to a part $p_i$ from a part list P, which stores all parts that can be used to build a system with $\dot{PI}(p_i)=PI_{p_i} \subseteq PI$ and $\dot{P}(pi_v)=p_w \in P$ Each part instance $pi_i \in PI$ has an associated set of failure modes $FM(pi_i)=\{fm_1, \ldots, fm_p\}$, where a failure mode $fm_j$ describes a specific kind of failure that a part $p_j=\dot{P}(pi_i)$ can have:

$$FM = \bigcap_{pi_k \in PI} FM_{pi_k}$$

Since in an FMEDA the failure mode instances can have different effects in different systems, for each system S a set of effects $E=\{e_1, \ldots, e_l\}$ is defined with $FM(fm_p)=e_q \in E$.

The inventive method comprises a third step 530 for generating for each component of the data model a component fault tree element for the respective component element, wherein each component fault tree element is associated with the respective component element.

Preferably, for each component or assembly $ci \in C$ defined in the failure mode and effects analysis $FMEDA_S$ of the system S a component fault tree element cfti is created with $cfti=\dot{CFT}(ci)$.

For the exemplary system as defined in FIG. 5b the following CFT elements are generated (see FIG. 5c):
- $\dot{CFT}(c1)=cft1$
- $\dot{CFT}(c2)=cft2$
- $\dot{CFT}(c3)=cft3$ Thereby, it is, for example, possible to check, if a component fault tree element exists within the component fault tree for each component/assembly defined within the failure mode and effects analysis of the technical system:

$\forall ci \in C: \exists cfti = \dot{CFT}(ci)$

The inventive method comprises a fourth step 540 for generating for each failure effect of a failure mode of a component of the data model a output failure mode, preferably one single output failure mode. for the respective component fault tree elements.

Preferably, the output failure modes for each of the component fault tree elements $cfti=\dot{CFT}(ci)$ are generated based on the information defined by the failure mode and effects analysis $FMEDA_S$ of the technical system S. Thereby, preferably a set of output failure modes OFM are created for each effect $e_j \in E$, where $e_j=\dot{FM}(fm_k)$ and $fm_k \in FM(p_l)$ with $p_l=\dot{P}(pim)$ and $pi_m \in PI_{ci}$. Preferably, for each $e_j \in E$ only one single output failure mode $ofm_x \in OFM(cfti)$ within each component fault tree element $cfti \in CFT$ is created although, for example, the effect $e_j \in E$ is a result of more than one failure modes which belong to part instances assigned to the component $ci \in C$.

For the component fault tree elements of the exemplary system as depicted in FIG. 5b the following output failure modes are generated (see FIG. 5d):
- $OFM(cft1)=\{a1\}$
- $OFM(cft2)=\{b1, c1, d1\}$
- $OFM(cft3)=\{b1, c1\}$ Preferably, based on the relationship between the failure mode and effects analysis and the component fault tree it is also possible to check, if all effects related to component/assembly of the system are represented within the CFT:

$\forall e_j=\dot{FM}(fm_k)$ with $fm_k \in FM(\dot{P}(pi_l))$ with $pi_l \in PI_{ci}$:
$\exists ofm_x \in OFM(cfti)$ with $cfti=\dot{CFT}(ci)$ The inventive method comprises a fifth step 550 for generating for each failure mode of the component of the data model a basic event, preferably one basic event, for the respective component fault tree elements.

Moreover, for each failure mode $fm_j \in FM(p_k)$ with $p_k = \dot{P}(pi_l)$ and $pi_l \in PI_{ci}$ a basic event $b_y \in B(cfti)$ is created within the component fault tree element $cfti = \dot{CFT}(ci)$. Thereby, each failure mode of a part represents an internal failure of the component which may lead to an output failure mode.

For the component fault tree elements of the exemplary technical system as depicted in FIG. 5b the following basic events are generated (see FIG. 5d):

B(cft1)={z}
B(cft2)={v, w, x, y}
B(cft3)={r, s, t, u}

If the source of information is, for example, a failure mode, effects, and diagnostic analysis, each basic event within the component fault tree can, for example, also be associated with its failure rate lambda as defined within the failure mode, effects, and diagnostic analysis.

Moreover, it is, for example, possible to check if all basic events related to component/assembly of the system are represented within the component fault tree:

$$\forall fm_j = FM(\dot{P}(pi_k)) \text{ with } pi_k \in PI_{ci} : \exists b_x \in OFM(cfti) \text{ with } cfti \in \dot{CFT}(ci)$$

After these steps are completed the incomplete/unfinished component fault tree CFT can be completed in a computer based manner, for example, according to a specification of the technical system. This can, for example, be done in an automated algorithm based manner or by a safety expert manually or in a semi-automated manner. For example, respective input failure modes for the respective output failure modes are added to the component fault tree CFT. Preferably, afterwards the basic events (all or a selected subset) are connected to their respective output failure modes and/or input failure modes.

In a variant of the preferred embodiment, the component fault tree is partially completed, for example, for important components or extremely safety critical components (e.g. radiation shielding etc.)

A possible resulting complete component fault tree is, for example, depicted in FIG. 5e.

The FIG. 6 shows a schematic for an apparatus for generating a component fault tree according to an embodiment of the invention.

In detail, the apparatus for generating a component fault tree comprises a first loading module 610, a first generation module 620 and an optional interface 601, which are communicatively connected by a bus 605.

Furthermore, the apparatus can, for example, comprise one or more additional further components or modules, e.g. a processor, a memory unit, an input device like a computer keyboard or computer mouse, and a display device like a TFT-Monitor.

The first loading module 610 is configured to load a data model of a failure mode and effects analysis for the technical system.

The first loading module 610 can, for example, be implemented by means of the processor, the memory unit and a first program component, which can, for example, load the data model by executing executable instructions of the first program component by means of the processor.

The first generating module 620 is configured to generate for each component of the technical system a component element for the component fault tree, wherein component output ports of the component elements are connected to input ports of the component elements.

Furthermore, the first generating module 620 is configured to generate for each component of the data model a component fault tree element for the respective component element, wherein each component fault tree element is associated with the respective component element.

Furthermore, the first generating module 620 is configured to generate generating for each failure effect of a failure mode of a component of the data model a output failure mode for the respective component fault tree elements.

Furthermore, the first generating module 620 is configured to generate for each failure mode of the component of the data model a basic event for the respective component fault tree elements.

The first generation module 620 can, for example, be implemented by means of the processor, the memory unit and a second program component, which can, for example, generate the nodes of the component fault tree and the component fault tree elements by executing executable instructions of the second program component by means of the processor.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other modifications may occur to those ordinarily skilled in the art.

The described embodiments and developments can be combined in any manner with one another as far as this is expedient. Further possible embodiments, developments and implementations of the invention also comprise not specifically cited combinations of features of the invention described above or in the following in relation to the exemplary embodiments.

[1] Vesely, W. E., Goldberg, F. F., Roberts, N. H., Haasl, D. F.: Fault Tree Handbook. US Nuclear Regulatory Commission (1981)

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The claims are as follows:

1. A computer-based method for generating a component fault tree for a technical system, the method comprising:

loading a data model of a failure mode and effect analysis for the technical system, wherein the data model includes product classes, reusable classes, and collaborative classes;

generating for each component of the technical system a component element for the component fault tree, wherein component output ports of the component elements are connected to input ports of the component elements;

generating for each component of the data model a component fault tree element for the respective component element, wherein each component fault tree element is associated with the respective component element;

generating for each failure effect of a failure mode of a component of the data model an output failure mode for the respective component fault tree elements; and generating for each failure mode of the component of the data model a basic event for the respective component fault tree elements.

2. The method according to claim 1, wherein input failure modes and logical gates are added to the component fault tree, the input failure modes and the logical gates are associated with the basic events, output failure modes, input ports and output ports.

3. The method according to claim 1, wherein each output failure mode is associated with an output port, for each output failure mode an input failure mode is created;

each input failure mode is associated with the respective input port, which is associated with the respective output port, which associated the respective output failure mode; each basic event is associated with the respective output failure mode.

4. The method according to claim 1, wherein the respective output failure mode is generated for failure effects which are a result of more than one failure mode.

5. The method according to claim 1, wherein the component fault tree is used to conduct a component fault tree analysis of the technical system.

6. The method according to claim 1, wherein by means of the component fault tree a test environment with a test technical system is controlled.

7. The method according to claim 1, wherein the basic events and the output failure modes are verified by a test environment with a test technical system.

8. The method according to claim 1, wherein the component fault tree is updated, if the data model is updated.

9. The method according to claim 1, wherein for the component fault tree inconsistency information is acquired, if the data model is updated.

10. A computer program product storing executable instructions adapted to perform the method according to claim 1.

11. An apparatus for generating a component fault tree for a technical system comprising:
a first loading module for loading a data model of a failure mode and effect analysis for the technical system, wherein the data model includes product classes, reusable classes, and collaborative classes;
a first generating module for generating for each component of the technical system a component element for the component fault tree, wherein component output ports of the component elements are connected to input ports of the component elements, generating for each component of the data model a component fault tree element for the respective component element, wherein each component fault tree element is associated with the respective component element, generating for each failure effect of a failure mode of a component of the data model an output failure mode for the respective component fault tree elements, and generating for each failure mode of the component of the data model a basic event for the respective component fault tree elements.

12. The apparatus according to claim 11, wherein the apparatus comprises one or more further modules configured to perform a method for generating a component fault tree for a technical system, the method comprising:

loading the data model of a failure mode and effect analysis for the technical system;

generating for each component of the technical system the component element for the component fault tree, wherein component output ports of the component elements are connected to input ports of the component elements;

generating for each component of the data model the component fault tree element for the respective component element, wherein each component fault tree element is associated with the respective component element;

generating for each failure effect of the failure mode of a component of the data model an output failure mode for the respective component fault tree elements; and generating for each failure mode of the component of the data model the basic event for the respective component fault tree elements.

13. A computer program product, comprising a computer readable hardware storage device storing a computer readable program code, the computer readable program code comprising executable instructions that when executed by a computer processor of a computing system configure a manufacturing device to manufacture an apparatus according to claim 11.

14. A providing device for the computer program product according to claim 13, wherein the providing device provides and/or saves the computer program product.

* * * * *